United States Patent [19]

Shirahata et al.

[11] 4,128,691

[45] Dec. 5, 1978

[54] PROCESS FOR THE PRODUCTION OF A MAGNETIC RECORDING MEDIUM

[75] Inventors: Ryuji Shirahata; Tatsuji Kitamoto; Masaaki Suzuki, all of Odawara, Japan

[73] Assignee: Fuji Photo Film Co., Ltd., Japan

[21] Appl. No.: 709,103

[22] Filed: Jul. 27, 1976

Related U.S. Application Data

[63] Continuation of Ser. No. 550,906, Feb. 19, 1975, abandoned.

[30] Foreign Application Priority Data

Feb. 21, 1974 [JP] Japan .................................. 49-19897

[51] Int. Cl.$^2$ ............................................. H01F 10/02
[52] U.S. Cl. .................................. 428/336; 427/128; 427/129; 427/132; 428/900
[58] Field of Search ................................ 427/127–132, 427/47, 48, 437, 438; 428/336, 900

[56] References Cited

U.S. PATENT DOCUMENTS

| | | | |
|---|---|---|---|
| 2,702,253 | 2/1955 | Bergstrom et al. | 427/304 |
| 3,116,159 | 12/1963 | Fisher et al. | 252/62.55 |
| 3,219,471 | 11/1965 | Chilton et al. | 427/129 |
| 3,353,986 | 11/1967 | Mathias et al. | 428/458 |
| 3,372,037 | 3/1968 | McGrath et al. | 427/438 |
| 3,379,539 | 4/1968 | McGrath et al. | 106/1 |
| 3,385,725 | 5/1968 | Schmeckenbecher | 427/438 |
| 3,549,417 | 12/1970 | Judge et al. | 427/132 |
| 3,874,923 | 4/1975 | Montiglio et al. | 427/132 X |
| 3,929,604 | 12/1975 | Shirahata et al. | 427/132 X |
| 4,009,111 | 2/1977 | Tamai | 75/0.5 AA |

*Primary Examiner*—Bernard D. Pianalto
*Attorney, Agent, or Firm*—Wenderoth, Lind & Ponack

[57] ABSTRACT

The process for the production of a magnetic recording medium by electroless plating comprises carrying out the plating in a plating aqueous solution containing at least one ferromagnetic metal ion, barium ion and hypophosphite ion as a reducing agent, and thus forming a magnetic metal thin film.

8 Claims, No Drawings

PROCESS FOR THE PRODUCTION OF A MAGNETIC RECORDING MEDIUM

This is a continuation, of application Ser. No. 550,906, filed Feb. 19, 1975 and now abandoned.

BACKGROUND OF THE INVENTION

This invention relates to a process for the production of a magnetic recording medium by electroless plating and more particularly, it is concerned with a novel process for the production of a magnetic recording medium having improved magnetic properties by electroless plating.

Thin films of ferromagnetic metals formed by electroplating, electroless plating, sputtering, vacuum vapor deposition or ion plating have lately been noticed as a binder-free, so called non-binder type magnetic recording medium in place of the magnetic recording media of the prior art in which a powdered magnetic material of $\gamma$-$Fe_2O_3$, Co-doped $\gamma$-$Fe_2O_3$, $Fe_3O_4$, $CrO_2$ or ferromagnetic alloy powders is dispersed in an organic binder and coated. It has been proposed theoretically and experimentally to raise the coercive force as well as to make the thickness thinner as one requirement for magnetic recording media for high density recording and it has been expected that such a non-binder type magnetic recording medium has great possibilities, which can readily be made thinner by a factor of 10 than coated type magnetic recording media and has a very large saturated magnetization.

The electroless plating method has the advantage that a magnetic layer can be formed on, in particular, a non-conductive substrate with a good adhesiveness and a magnetic layer having excellent magnetic properties can uniformly be formed. In this specification, the electroless plating means a chemical reduction plating wherein a metal ion to be plated is reduced with a reducing agent in a plating solution and deposited on a substrate under metallic state. In order to start and accelerate this reduction reaction on the surface of the substrate only, it is necessary to give a catalytic activity to the surface of the substrate by a pretreatment. Where a plastic substrate is subjected to magnetic plating, for example, various steps of defatting - etching - substrate surface activating - electroless magnetic plating have commonly been carried as disclosed in U.S. Pat. Nos. 3,245,826 and 3,353,986. The steps of defatting and etching are carried out so as to form a magnetic plating layer uniformly on a substrate with a good adhesiveness and both steps may be accomplished by one solution. For example, an aqueous solution of sodium hydroxide or mixed solution of sulfuric acid and a bichromate is widely used as a defatting and etching solution. The usual method for the substrate surface activation treatment consists in sensitization using a sensitizer consisting of a hydrochloricacidic solution of $SnCl_2$ and subsequent activation using an activator containing a noble metal ion such as Pd, Au or Ag, as described in U.S. Pat. No. 2,702,253. On the surface of the substrate thus treated are bonded fine particles of Pd, Au or Ag capable of acting as a catalyst of plating reaction. The other methods for the substrate surface activation treatment, as described in U.S. Pat. Nos. 3,011,920 and 3,532,516, have also been put to practical use, which consist in a treatment with a Pd-Sn sol (catalyst treatment) and a subsequent treatment with an accelerator.

In addition, there are special methods for the substrate surface activation treatment such as by causing fine particles of catalytic metal to adhere to the surface of a substrate through vapor deposition, by dispersing fine particles of catalytic metal in an organic binder and coating onto the surface of a substrate and by providing a layer containing a salt of catalytic metal on the surface of a substrate and reducing the salt with a reducing agent to the catalytic metal. As an electroless magnetic plating bath to obtain a high remanence magnetization and coercive force are well known baths containing cobalt ion or cobalt ion plus nickel ion as a magnetic metal ion and hypophosphite ion as a reducing agent (U.S. Pat. Nos. 3,116,159 and 3,219,471). It is widely believed that the electroless plated magnetic film prepared from this plating bath contains a small amount of P deposited at the grain boundary of Co or Co-Ni to thus give a high coercive force.

It has been reported that the coercive force of a Co-P or Co-Ni-P magnetic film made by the electroless plating method of the prior art exceeds 300 oersteds and sometimes reaches 1500 oersteds. According to our experiments however, the coercive force depends on the thickness of a plated magnetic film and increases with the decrease of the film thickness and, in the case of a Co-P film of the prior art, for example, only a coercive force of at most 700 oersteds is obtained when the film is thick enough to give a sufficient out-put as a magnetic recording medium, for example, 0.15 microns thick.

SUMMARY OF THE INVENTION

It is an object of the invention to solve the above described disadvantages of the prior art.

It is another object of the invention to provide a process for the production of a magnetic recording medium having a high coercive force and high residual magnetic flux density (Br).

It is a further object of the invention to provide a novel process for producing a magnetic plating film having improved magnetic properties by electroless plating.

We, the inventors, have made various studies on electroless plating baths for producing magnetic recording media and consequently found that the above described objects can be accomplished by adding a small amount of barium ion to the known electroless plating both containing a ferromagnetic ion such as cobalt ion or cobalt ion plus nickel ion.

DETAILED DESCRIPTION OF THE INVENTION

That is to say, in accordance with the present invention, there is provided a process for the production of a magnetic recording medium by electroless plating, which comprises carrying out the plating in a plating bath containing a ferromagnetic metal ion, preferably, cobalt ion or cobalt ion plus nickel ion, barium ion and hypophosphite ion as a reducing agent and thus forming a magnetic metal thin film.

The electroless magnetic plating bath can contain ordinarily (a) cobalt, nickel, iron and/or other metal ions to form a ferromagnetic metal thin film, (b) a reducing agent such as hypophosphite, borohydride compound or hydrazine, (c) a complexing agent such as malonic acid, succinic acid, tartaric acid, citric acid or ammonium salts thereof, (d) a pH buffering agent such as formic acid, acetic acid, malonic acid, succinic acid or citric acid and (e) a pH regulator such as sodium hydroxide, ammonium hydroxide or sodium carbonate.

In a preferred embodiment of the invention, the electroless plating bath consists of an aqueous solution containing 0.02 to 0.6 mol/l of cobalt ion, 0 to 0.02 mol/l of nickel ion, 0.0002 to 0.005 mol/l of barium ion and 0.03 to 0.4 mol/l of hypophosphite ion as a reducing agent.

The above described complexing agent, pH buffer and pH regulator can optionally be incorporated in this aqueous solution. The pH of the above described plating bath is preferably 6.5 to 9.0 in view of the use of hypophosphorous acid as a reducing agent and the temperature of the plating bath is preferably 60° to 95° C. so as to advance the plating rapidly. The plating rate is generally 50 to 5000 A/min, preferably 200 to 2000 A/min.

As a compound capable of giving cobalt ion are used mono- to tetravalent cobalt compounds, for example, inorganic salts, inorganic acid salts, organic acid salts and complex salts. Examples of these cobalt compounds are cobalt chloride, cobalt sulfate, cobalt nitrate, cobalt bromide, cobalt fluoride, cobalt iodide, cobalt perchlorate, cobalt acetate, cobalt benzoate, hexammine cobalt chloride, hexammine cobalt nitrate, hexammine cobalt sulfate, aquopentammine cobalt chloride, ethylenediamine cobalt chloride, cobalt ammonium sulfate, alum (KCo (SO$_4$)$_2$.12H$_2$O), cesium hexafluorocobaltate, heteropoly acid salt (3K$_2$O.CoO$_2$.9MoO$_3$.6.5H$_2$O), cobalt aluminate, cobalt arsenide, cobalt L-asparaginate, cobalt borate, cobalt carbide, cobalt carbonyl, cobalt platinochloride, cobalt cyclohexanebutyrate, cobalt 2-ethylhexoate, cobalt fluoborate, cobalt fluosilicate, cobalt formate, cobalt gluconate, cobalt glycine, cobalt hydroxide, cobalt molybdate, cobalt lactate, cobalt laurate, cobalt naphthenate, cobalt nitride, cobalt oleate, cobalt arsenate, cobalt boride, cobalt chromate, cobalt citrate, cobalt cyanide, cobalt ferrocyanide, cobalt hexachlorostannate, cobalt oxalate, cobalt phosphate, cobalt phosphite, cobalt selenate, cobalt selenite, cobalt sulfamate, cobalt thiocyanate, potassium cobalt oxalate, cobalt selenide, cobalt silicate, cobalt fluosilicate, cobalt stannate, cobalt titanate and cobalt tungstate.

Above all, cobalt chloride, sulfate, nitrate, bromide, fluoride, iodide, perchlorate, acetate, benzoate, hexammine chloride, hexammine sulfate, hexammine nitrate, aquopentammine chloride, ethylenediamine chloride and ammonium sulfate are particularly preferable.

As a compound capable of giving nickel ion are used mono- to tetravalent nickel compounds, for example, inorganic salts, inorganic acid salts, organic acid salts and complex salts. Examples of these compounds are nickel chloride, nickel sulfate, nickel nitrate, nickel bromide, nickel iodide, nickel perchlorate, nickel hypophosphite, nickel selenate, nickel formate, nickel benzenesulfonate, diaquotetrammine nickel nitrate, hexammine nickel chloride, nickel ammonium sulfate, sodium nickel carbonyl (Na$_2$(Ni$_4$(CO)$_9$)), nickel ferricyanide, nickel ferrocyanide, nickel hydroxide, nickel periodate, NiCl$_2$(P(C$_6$H$_5$)$_3$)$_2$, NiP(C$_3$H$_6$As(CH$_3$)$_2$)$_3$(CN), LiNiO$_2$, K$_3$(NiF$_6$), K$_2$(NiF$_6$), Ni((CH$_3$)$_2$AsC$_6$H$_4$As(CH$_3$)$_2$)$_2$Cl$_2$)Cl, heteropoly acid salt (3BaO.NiO$_2$.9MoO$_3$.12H$_2$O), nickel aluminate, nickel chloroaluminate, nickel antimonate, nickel arsenate, nickel arsenide, nickel benzoate, nickel carbonyl bis(diphenylphosphite), nickel borate, nickel bromate, nickel carbide, nickel carbonyl, nickel palladium chloride, nickel platinochloride, nickel citrate, nickel cyclohexanebutyrate, nickel cyclopentamethylenedithiocarbamate, nickel dibutyldithiocarbamate, nickel dimethyldithiocarbamate, nickel ethylenediamine sulfate, nickel lactate, nickel naphthenate, nickel acetate, nickel fluoborate, nickel oxalate, nickel pentamethylenedithiocarbamate, nickel phosphate, nickel phosphite, nickel potassium cyanide, nickel potassium fluoride, nickel potassium sulfate, nickel selenide, nickel fluosilicate, nickel sulfamate, nickel tartrate, nickel telluride, nickel tetrammine nitrite, nickel thiocyanate, nickel titanate and nickel tungstate.

Above all, nickel chloride, sulfate, nitrate, bromide, iodide, perchlorate, hypophosphite, selenate, formate, benzenesulfonate, diaquotetrammine nitrate, hexammine chloride and ammonium sulfate are particularly preferable.

As a compound capable of giving barium ion are used divalent barium compounds, for example, inorganic salts, inorganic acid salts, organic acid salts and complex salts of barium. Examples of these compounds are barium chloride, barium oxide, barium nitrate, barium bromide, barium iodide, barium nitrite, barium chlorate, barium hypophosphite, barium perchlorate, barium permanganate, barium dithionate, barium acetate, barium butyrate, barium hydroxide, barium phosphate, barium phosphite, barium acrylate, barium methacrylate, barium chloranilate, barium inosinate, barium stearate, barium aluminate, barium arsenide, barium azide, barium benzenesulfonate, barium phenolsulfonate, barium p-toluenesulfonate, barium boride, barium bromate, barium citrate, barium cobalt (II) formate, barium copper (II) formate, barium cyanide, barium cyanate, barium cyclohexanebutyrate, barium ethylsulfate, barium D-gluconate, barium lactate, barium laurate, barium malate, barium succinate, barium tartrate, barium oxalate, barium palmitate, barium malonate, barium ricinolate, barium salicylate, barium naphthenate, barium undecylenate, barium metatungstate, barium perrhenate, barium metatitanate, barium molybdate, barium thiocyanate, barium trithionate and barium tetrathionate.

Above all, barium chloride, oxide, nitrate, nitrite, bromide, iodide, chlorate, hypophosphite, perchlorate, permanganate, dithionate, acetate and butyrate are particularly preferable.

As a compound capable of giving hypophosphite ion (PH$_2$O$_2$)- are used hypophosphites. Examples of these hypophosphites are ammonium, sodium, magnesium, aluminum, potassium, calcium, manganese, iron, cobalt, nickel, zinc, barium, cerium, lead and uranyl hypophosphites. Above all, ammonium, sodium, magnesium, potassium and calcium hypophosphites are particularly preferable.

Suitable compounds are respectively selected from the above described groups and dissolved in water to prepare an aqueous solution containing cobalt ion, nickel ion, barium ion and hypophosphite ion.

To the plating bath of the invention, in addition, can be added at least one ion of Li, B, Mg, Ti, V, Cr, Cu, Zn, Ge, Y, Zr, Nb, Mo, Ru, Rh, Pd, Ag, Cd, Sn, Sb, Te, Cs, W, Re, Pb, Bi, La, Ce, Pr, Nd and Ac ions in the range of 0.0001 to 0.02 mol/l, depending upon the object of use.

The thickness of a magnetic thin film according to the invention is determined so as to give a sufficient output as a magnetic recording medium and to effect satisfactorily a high density recording and, in general, 0.05 to 1.0 micron, preferably 0.1 to 0.4 micron. The substrate of the invention can be selected from those of non-conductive materials such as polyethylene terephthalate, polyimide, polyvinyl chloride, cellulose triacetate, polycarbonate, polyethylene naphthalate, glass and ceramics, and metallic materials such as aluminum and brass. As occasion demands, the substrate can be subjected to a pretreatment, for example, formation of metallic films by vapor deposition or by plating, or coating of adhesives. According to the instant invention, moreover, a magnetic thin film can be uniformly formed irrespective of the shapes of the substrate, for example, tapes, sheets, cards, disks and drums.

A magnetic recording medium having very excellent magnetic properties, for example, a squareness ratio of 0.80 and coercive force of 1000 oersteds with a film thickness of 0.2 micron sufficient to give an output as a magnetic recording medium can be produced by the use of the non-electrolytic magnetic plating bath according to the present invention. The present invention thus succeeds in improvement of the electroless plating of the prior art and is very useful for the realization of a magnetic recording medium by electroless plating.

The present invention will be further illustrated in greater detail in the following examples and comparative examples. It will be self-evident to those skilled in the art that the ratios, ingredients in the following formulations and the order of operations can be modified within the scope of the present invention. Therefore, the present invention is not to be interpreted as being limited to the following examples.

EXAMPLES 1 TO 18

A polyethylene terephthalate film having a thickness of 25 microns was dipped in an aqueous solution of 5 mols/l of sodium hydroxide, heated at 80° C., for 10 minutes for the purpose of defatting and etching, washed adequately with water and then subjected to a substrate surface activation treatment with the following solution:

| Sensitizer: | in 1000 ml | |
| --- | --- | --- |
| | $SnCl_2 \cdot 2H_2O$ | 10 g |
| | HCl | 30 ml |
| Activator: | in 1000 ml | |
| | $PdCl_2$ | 0.25 g |
| | HCl | 10 ml |

After the film was dipped in the sensitizer for 3 minutes and washed with distilled water, and then dipped in the activator for 1 minute and washed with distilled water, it was subjected to electroless plating using a plating bath composition as shown in Table 1.

Table I

| | Plating Solution Composition (mol/l) | | | | | | | | | | |
|---|---|---|---|---|---|---|---|---|---|---|---|
| Example | Cobalt Chloride $CoCl_2 \cdot CH_2O$ | Cobalt Sulfate $CoSO_4 \cdot 7H_2O$ | Sodium Hypophosphite $HoH_2PO_2 \cdot H_2O$ | Ammonium Chloride $NH_4Cl$ | Ammonium Sulfate $(NH_4)_2SO_4$ | Citric Acid $H_3C_6H_5O_7 \cdot H_2O$ | Malonic Acid $H_2C(OOCH)_2$ | Sodium Tartrate $Na_2C_4H_4O_6 2H_2O$ | Boric Acid $H_3BO_3$ | Barium Chloride $PoCl_2 2H_2O$ | pH | Temp. (°C) |
| 1 | 0.12 | | 0.20 | 0.50 | | | | | 0.50 | | 7.5 | 80 |
| 2 | 0.12 | | 0.20 | 0.50 | | | | | 0.50 | 0.001 | 7.5 | 80 |
| 3 | | 0.02 | 0.03 | | 0.15 | 0.08 | 1.5 | | 0.03 | 7.0 | 7.0 | 80 |
| 4 | | 0.02 | 0.03 | | 0.15 | 0.08 | 1.5 | | 0.0005 | | 8.0 | 90 |
| 5 | 0.3 | | 0.12 | 0.48 | | | | | 0.50 | | 8.0 | 90 |
| 6 | 0.03 | | 0.12 | 0.48 | | | | | 0.50 | 0.003 | 8.5 | 70 |
| 7 | | 0.11 | 0.09 | | 0.50 | | | 0.03 | | | 8.5 | 70 |
| 8 | | 0.11 | 0.09 | | 0.50 | | | 0.5 | | 0.005 | 7.3 | 80 |
| 9 | 0.04 | | 0.15 | 0.96 | | 0.03 | | 0.34 | | | 7.3 | 80 |
| 10 | 0.04 | | 0.15 | 0.96 | | 0.03 | | 0.34 | | 0.0002 | 6.8 | 90 |
| 11 | | 0.22 | 0.10 | | 0.93 | | | 0.4 | 0.05 | | 6.8 | 90 |
| 12 | | 0.22 | 0.40 | | 0.93 | | | 0.71 | 0.05 | 0.002 | 8.2 | 80 |
| 13 | 0.6 | | 0.40 | 0.96 | | | | 0.71 | 0.50 | | 8.2 | 80 |
| 14 | 0.6 | | 0.05 | 0.96 | | | | 0.89 | 0.50 | 0.0003 | 7.5 | 80 |
| 15 | | 0.04 | 0.05 | | 0.20 | 0.35 | 1.5 | 0.89 | | | 7.5 | 80 |
| 16 | | 0.04 | 0.18 | | 0.20 | 0.35 | 1.5 | | 0.50 | 0.002 | 8.7 | 80 |
| 17 | 0.13 | | 0.18 | | | | | | 0.50 | | 8.7 | 80 |
| 18 | 0.13 | | 0.18 | | | | | | | 0.001 | 8.7 | 80 |

The plating was carried out in each case until the film thickness reached 0.2 micron for the purpose of comparison of the magnetic properties. The magnetic properties of the resultant magnetic plating film were measured and the results were shown in Table 2.

Table 2

| Example | Magnetic Properties | | | |
|---|---|---|---|---|
| | Coercive Force Hc (Oe) | Squareness Ratio (Br/Bm) | Remanence Magnetization Br (Gauss) | Saturated Magnetization Bm (Gauss) |
| 1 | 660 | 0.65 | 8400 | 12900 |
| 2 | 935 | 0.70 | 8900 | 12700 |
| 3 | 350 | 0.69 | 9100 | 13100 |
| 4 | 545 | 0.75 | 9700 | 12900 |
| 5 | 705 | 0.70 | 8500 | 12100 |
| 6 | 1035 | 0.78 | 9500 | 12200 |
| 7 | 415 | 0.76 | 10900 | 14300 |
| 8 | 790 | 0.78 | 10900 | 14000 |
| 9 | 570 | 0.69 | 8200 | 11800 |
| 10 | 755 | 0.75 | 8900 | 11800 |
| 11 | 525 | 0.78 | 8900 | 11400 |
| 12 | 805 | 0.82 | 9100 | 11100 |
| 13 | 635 | 0.62 | 7900 | 12700 |
| 14 | 985 | 0.75 | 9400 | 12600 |
| 15 | 480 | 0.72 | 9700 | 13500 |
| 16 | 765 | 0.75 | 10100 | 13400 |
| 17 | 260 | 0.71 | 9000 | 12600 |
| 18 | 585 | 0.80 | 10100 | 12600 |

As is evident from these results, magnetic films plated from aqueous solutions containing barium ion, hypophosphite ion and cobalt ion (Examples 2, 4, 6, 8, 10, 12, 14, 16 and 18) give magnetic recording media suitable for high density recording, having a higher coercive force and squareness ratio than magnetic films plated from barium ion-free solutions (Examples 1, 3, 5, 7, 9, 11, 13, 15 and 17).

EXAMPLE 19

A polyethylene terephthalate film of 22 microns in thickness was dipped in an aqueous solution of 5 mols/l of sodium hydroxide, warmed at 80° C., for 5 minutes for the purpose of defatting, washed adequately with water and then subjected to a substrate surface activation treatment for 3 minutes using Catalyst 6F Solution and Accelerator 19 Solution manufactured by Shipley Co. (2300 Washington St., Newton, Massachusetts) as a surface activation solution. Then the substrate was dipped in the following electroless plating solution and plated to give a plating film thickness of 0.12 micron:

| | |
|---|---|
| Cobalt Chloride ($CoCl_2 \cdot 6H_2O$) | 0.06 mol/l |
| Sodium Hypophosphite ($NaH_2PO_2 \cdot H_2O$) | 0.10 mol/l |
| Ammonium Chloride ($NH_4Cl$) | 0.20 mol/l |
| Citric Acid ($H_3C_6H_5O_7 \cdot H_2O$) | 0.09 mol/l |
| Boric Acid ($H_3BO_3$) | 0.50 mol/l |
| Barium Chloride ($BaCl_2 \cdot 2H_2O$) | 0–0.007 mol/l |
| pH = 7.5, Temperature = 80° C | |

The coercive forces and squareness ratios of magnetic plating films prepared with various concentrations of barium chloride and the plating rates were shown in Table 3.

Table 3

| | Relation of Barium Ion Concentration in Plating Solution with Magnetic Property | | |
|---|---|---|---|
| Barium Ion Concentration (mol/l) | Coercive Force (Oe) | Squareness Ratio (Br/Bm) | Plating Rate (A/min) |
| 0 | 535 | 0.71 | 600 |
| 0.001 | 790 | 0.73 | 500 |
| 0.002 | 825 | 0.75 | 480 |
| 0.003 | 850 | 0.79 | 450 |
| 0.004 | 870 | 0.74 | 440 |
| 0.005 | 885 | 0.70 | 400 |
| 0.006 | 890 | 0.64 | 300 |
| 0.007 | 880 | 0.65 | 220 |

As is evident from these results, the coercive force and squareness ratio are improved by the addition of barium ion. In particular, this effect is remarkable within a concentration range of 0.001 to 0.005 mol/l and the plating speed lowers when more than 0.006 mol/l.

EXAMPLES 20 TO 27

A polyethylene terephthalate film having a thickness of 100 microns was used as a substrate and dipped in an aqueous solution of 5 mols/l of sodium hydroxide, warmed at 80° C., for 8 minutes for the purpose of defatting and etching. After washing adequately with distilled water, the film was dipped for 5 minutes in the following substrate surface activation treatment solution described in U.S. Pat. No. 3,011,920:

| Pd-Sn Sol (Catalyst Liquor): | in 1000 ml |
|---|---|
| $PdCl_2$ | 1 g |
| $Na_2SnO_3 \cdot 3H_2O$ | 1.5 g |
| $SnCl_2 \cdot 2H_2O$ | 37.5 g |
| HCl | 300 ml |

$HClO_4$ was used as the accelerator. After the activation treatment, the film was subjected to magnetic plating to give a film thickness of 0.3 micron in a plating bath composition as shown in Table 3.

Table 4

| | Plating Solution Composition (mol/l) | | | | | | | | |
|---|---|---|---|---|---|---|---|---|---|
| Example | Cobalt Chloride $CoCl_2 \cdot 6H_2O$ | Nickel Chloride $NiCl_2 \cdot 6H_2O$ | Sodium Hypophosphite $NaH_2PO_2 \cdot H_2O$ | Ammonium Chloride $NH_4Cl$ | Sodium Citrate $Na_3O_6H_5O_7 \cdot 2H_2O$ | Sodium Potassium Tartrate $NaKC_4H_4O_6 \cdot 4H_2O$ | Barium Chloride $BaSi_2 \cdot 2H_2O$ | pH | (° C) |
| 20 | 0.05 | 0.0015 | 0.04 | 0.24 | 0.12 | | | 7.5 | 80 |
| 21 | 0.05 | 0.0015 | 0.04 | 0.24 | 0.12 | | 0.0005 | 7.5 | 80 |
| 22 | 0.05 | 0.0015 | 0.04 | 0.24 | 0.12 | | 0.001 | 7.5 | 80 |
| 23 | 0.05 | 0.03 | 0.04 | 0.24 | 0.12 | | 0.001 | 7.5 | 80 |
| 24 | 0.13 | 0.02 | 0.09 | | | 0.5 | | 8.0 | 85 |
| 25 | 0.13 | 0.02 | 0.09 | | | 0.5 | 0.002 | 8.0 | 85 |
| 26 | 0.13 | 0.02 | 0.09 | | | 0.5 | 0.004 | 8.0 | 85 |
| 27 | 0.13 | 0.04 | 0.09 | | | 0.5 | 0.004 | 8.0 | 85 |

The magnetic properties of the resultant magnetic plating films were measured, thus obtaining results as shown in Table 5.

Table 5

| Example | Magnetic Properties | | | |
|---|---|---|---|---|
| | Coercive Force Hc (Oe) | Squareness Ratio (Br/Bm) | Remanence Magnetization Br (Gauss) | Saturated Magnetization Bm (Gauss) |
| 20 | 435 | 0.72 | 8400 | 11600 |
| 21 | 615 | 0.75 | 8700 | 11600 |
| 22 | 640 | 0.78 | 9000 | 11600 |
| 23 | 655 | 0.60 | 6800 | 11400 |
| 24 | 470 | 0.75 | 8200 | 11000 |

Table 5-continued

| Example | Magnetic Properties | | | |
|---|---|---|---|---|
| | Coercive Force Hc (Oe) | Squareness Ratio (Br/Bm) | Remanence Magnetization Br (Gauss) | Saturated Magnetization Bm (Gauss) |
| 25 | 765 | 0.80 | 8900 | 11100 |
| 26 | 775 | 0.79 | 8500 | 10800 |
| 27 | 750 | 0.59 | 5800 | 9900 |

It is apparent from these results that plated magnetic films prepared from plating solutions containing cobalt ion, nickel ion, hypophosphite ion and barium ion (Examples 21, 22, 23, 25, 26 and 27) show higher coercive forces as compared with those from barium-free plating solutions (Examples 20 and 24) and, when the concentration of nickel ion is 0.02 mol/l or less, a higher squareness ratio is obtained.

In the practice of the present invention, the concentrations of cobalt ion and hypophosphite ion in a plating solution can be widely varied, but, considering the stability of a plating solution, a cobalt ion concentration of from 0.02 to 0.6 mol/l and hypophosphite ion concentration of from 0.03 to 0.4 mol/l are suitable and practical as in the foregoing examples. Moreover, it is apparent from the foregoing examples that, when a plating bath having a nickel ion concentration of from 0 to 0.02 mol/l and a barium ion concentration of from 0.0002 to 0.005 mol/l is used, a magnetic plating film can be produced having a high coercive force, high squareness ratio and high remanence magnetization, being suitable for use as a high density magnetic recording medium.

The methods of the substrate surface activation treatment with a sensitizer-activator or catalyst accelerator are only shown in the foregoing examples, but the invention is not limited thereby. The similar advantages or effects can also be expected by other activation treatment methods, for example, method of coating a catalytic metal.

What is claimed is:

1. A process for the production of a magnetic recording medium by electroless plating onto a substrate, which comprises carrying out the electroless plating in a plating aqueous solution containing 0.02 to 0.6 mol/l of cobalt ion, 0 to 0.02 mol/l of nickel ion, 0.0002 to 0.005 mol/l of barium ion, 0.03 to 0.4 mol/l of hypophosphite ion and a complexing agent at a temperature of 60° C.–95° C. and wherein the pH of the aqueous solution ranges from 6.5 to 9.0.

2. The process of claim 1, wherein said cobalt ion or cobalt ion plus nickel ion are released from inorganic salts, inorganic acid salts, organic acid salts or complex salts.

3. The process of claim 1, wherein said substrate is selected from the group consisting of non-conductive materials such as polyethylene terephthalate, polyimide, polyvinyl chloride, cellulose triacetate, polycarbonate, polyethylene naphthalate, glass and ceramics, and conductive materials such as aluminum and brass.

4. The process of claim 1, wherein said substrate is subjected to a pretreatment.

5. The process of claim 1, wherein said electroless plating is carried out to give a film thickness of 0.05 to 1.0 micron.

6. A magnetic recording medium produced by the process of claim 1.

7. A process according to claim 1, wherein said barium ion is released from a barium salt selected from the group consisting of barium chloride, barium oxide, barium nitrate, barium nitrite, barium iodide, barium chlorate, barium hypophosphite, barium perchlorate, barium permanganate, barium dithionate, barium acetate, barium bromide and barium butyrate.

8. The process of claim 1, wherein said complexing agent is selected from the group consisting of malonic acid, succinic acid, tartaric acid, citric acid, ammonium salts thereof and mixtures thereof.

* * * * *